United States Patent
Dahman et al.

(10) Patent No.: US 7,107,397 B2
(45) Date of Patent: Sep. 12, 2006

(54) MAGNETIC TAPE DATA STORAGE SYSTEM BUFFER MANAGEMENT

(75) Inventors: Kirby Grant Dahman, Tucson, AZ (US); Paul Merrill Greco, Tucson, AZ (US); Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 10/447,899

(22) Filed: May 29, 2003

(65) Prior Publication Data

US 2004/0243760 A1 Dec. 2, 2004

(51) Int. Cl.
*G06F 12/00* (2006.01)
(52) U.S. Cl. ............... 711/113; 711/111; 711/129; 711/162; 710/52; 710/60
(58) Field of Classification Search ............. 711/113
See application file for complete search history.

(56) References Cited

U.S. PATENT DOCUMENTS

| | | | |
|---|---|---|---|
| 4,792,898 A | 12/1988 | McCarthy et al. | 364/200 |
| 5,121,479 A | 6/1992 | O'Brien | 395/250 |
| 5,210,851 A | 5/1993 | Kato et al. | 395/425 |
| 5,319,760 A | 6/1994 | Mason et al. | 395/400 |
| 5,712,970 A * | 1/1998 | Arnott et al. | 714/6 |
| 5,809,522 A | 9/1998 | Novak et al. | 711/118 |
| 5,982,572 A | 11/1999 | Dahlerud | 360/72.2 |
| 6,112,255 A * | 8/2000 | Dunn et al. | 710/7 |
| 6,119,209 A * | 9/2000 | Bauman et al. | 711/162 |
| 6,141,728 A * | 10/2000 | Simionescu et al. | 711/113 |
| 6,425,042 B1 * | 7/2002 | Ikeda et al. | 711/4 |

* cited by examiner

Primary Examiner—Matthew Kim
Assistant Examiner—Jonathan Barton
(74) Attorney, Agent, or Firm—John H. Holcombe

(57) ABSTRACT

A sequential buffer for a magnetic tape data storage system comprises a plurality of segments. A buffer management system buffers data in the sequential buffer, conducting a data transfer process. Subsequently, some of the buffered data is maintained in some, but less than all, the segments of the buffer. Additionally, the maintained buffered data is indicated as VALID data. Thus, a subsequent process may be conducted directly using the data maintained in the buffer, and avoids moving the tape to reread the data.

80 Claims, 7 Drawing Sheets

MAGNETIC TAPE DATA STORAGE SYSTEM BUFFER MANAGEMENT

FIELD OF THE INVENTION

This invention relates to sequential buffers for magnetic tape data storage systems, and, more particularly, to managing a buffer for transferring data with respect to magnetic tape.

BACKGROUND OF THE INVENTION

Data that is written to or read from magnetic tape typically is supplied by or supplied to a host or host system that is operating at a different speed than is the magnetic tape data storage system.

Thus, the host and the magnetic tape data storage system, such as a magnetic tape drive, are rarely operating at identical speeds in a balanced environment. Instead, typically, either the buffer is full, meaning that the incoming data (data from the host to be written, or data read from the magnetic tape) to the buffer is limited by the speed that data is removed from the buffer and thus can then be overwritten; or the buffer is nearly empty, meaning that the outgoing data from the buffer (either host data being written to the media, or read data being supplied to the host) is limited by the speed that data is supplied to the buffer.

When the effective host data rate exceeds the native data rate of the magnetic tape data storage system on a write, or when it is less than the native data rate on a read, then the differences in speeds requires that the magnetic tape data storage system stop the magnetic tape to allow the slower speed operation to catch up. Additionally, a sequence of commands may result in stopping, and perhaps reversing, the magnetic tape. The effective host data rate is the host data rate after data compression, which is typically provided by the magnetic tape data storage system. Herein, the term "host data rate" should be taken to mean the effective host data rate if the data is compressed, or to mean that the host data is not compressible, or uncompressed if there is no compression engine in the magnetic tape data storage system.

An example of a command which typically requires that the tape be stopped and reversed is a "Space" command with a negative argument, which is sometimes referred to as "Space backwards". In that case, the tape might be stopped, accelerated backwards, then re-accelerated forwards so that the target of the Space backwards command, which might be a short distance previous to the present position, can be read forward.

Another type of command which might cause the tape to be stopped is a synchronizing command. Any type of write command issued with the "Immediate" bit not set is non-Immediate, which means that the drive is not to reply with a command complete until after all of the data, up to and including the data to be written as part of that command, has been written to tape, and verified to be written properly. One instance of a synchronizing command is a "Write filemark" command with an argument of zero filemarks to be written, in which case the whole purpose of the command is to cause the magnetic tape data storage system to write all the data that is in its data buffer to tape, or "flushed". In the case of a synchronizing command, followed by another write command, the magnetic tape data storage system must stop the tape, accelerate it backwards, stop the tape again, and then accelerate it forward sufficiently in front of the end of the previously written data so that the writing of the new data may begin immediately following the data written by the last synchronizing command. Repositioning the tape to allow writing to resume following the present position is referred to as a "reposition", or sometimes as a "backhitch".

Another case where a reposition is typically required is when a magnetic tape data storage system which is writing data to tape runs out of data in the buffer be written, which will happen when the data rate at which the magnetic tape data storage system is writing to tape is faster than the rate at which the host sends it data.

All of these situations may result in inefficiencies in operation.

SUMMARY OF THE INVENTION

The present invention comprises a buffer system for a magnetic tape data storage system, a magnetic tape drive, a method, and a computer program product usable with a programmable computer processor having computer readable program code embodied therein, for managing a sequential buffer for a magnetic tape data storage system.

The magnetic tape data storage system transfers data with respect to magnetic tape for writing and reading data on magnetic tape. The sequential buffer comprises a plurality of segments.

A buffer management system, in one embodiment:

buffers at least one data record in the sequential buffer in at least one of the segments, as part of the magnetic tape data storage system conducting a transfer process transferring the at least one data record; and at least subsequent to the magnetic tape data storage system conducting the transfer process transferring at least one data record, maintains buffered data of the buffered at least one data record, in at least one of the segments, and less than all the segments of the buffer, such that the maintained buffered data is prevented from being overwritten while so maintained.

In a further embodiment, the buffer management system indicates the maintained buffered data of the at least one of the segments, comprises VALID data, whereby the data need not be read from the magnetic tape.

Thus, a subsequent process may be conducted, and directly use the data maintained in the buffer. As the result, the magnetic tape data storage system will not be required to move the media to a point where it would accelerate the magnetic tape to operational speed at the point required to read the data.

Further, by maintaining buffered data in less than all the segments of the buffer, the buffer is available for conducting the subsequent process.

In one embodiment, the buffer management system maintains the buffered data of the buffered at least one data record, in a predetermined number of segments of the sequential buffer. The predetermined number of maintained segments, in one embodiment, comprises a number of segments related to the total number of the plurality of segments of the sequential buffer.

In another embodiment, the buffer management system identifies the maintained buffered data with a segment pointer.

In a further embodiment, the buffer management system maintains the buffered data of the buffered at least one data record, in a variable number of segments, less than all the segments of the buffer.

In another embodiment, the variable number of segments, comprises a number of segments determined as a function of the characterization of the at least one data record.

In still another embodiment, the variable number of segments comprises a number of segments determined as a function of the performance of the host system as compared to the performance of the magnetic tape data storage system.

In a further embodiment, the variable number of segments of the buffered at least one data record maintained by the buffer management system, comprises a number of segments determined as a function of the frequency of preceding backwards spacing operations conducted with respect to the magnetic tape data storage system by the host system.

In a still further embodiment, the variable number of segments comprises a number of segments determined as a function of the lengths of preceding backwards spacing operations conducted with respect to the magnetic tape data storage system by the host system.

In another embodiment, the variable number of segments varies up to a maximum number of segments determined as a function of the total number of the plurality of segments of the sequential buffer.

In a further embodiment, upon a command for the magnetic tape data storage system to conduct a backwards spacing and forward read operation, the buffer management system instead provides at least some of the data maintained in the at least one segment of the sequential buffer.

In a still further embodiment, upon a command for the magnetic tape data storage system to conduct a backwards read operation, the buffer management system instead provides at least some of the data maintained in the at least one of the segment of the sequential buffer.

In another embodiment, segments are tracked whose data has been transferred and are made available for overwriting, but which segments have not been overwritten, and data of the tracked segments are re-enabled as VALID data. The tracked segments may comprise both the segments available for overwriting and the segments having maintained buffered data, if any. Further, the buffer may not be enabled to maintain buffered data, and only segments available for overwriting are tracked.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
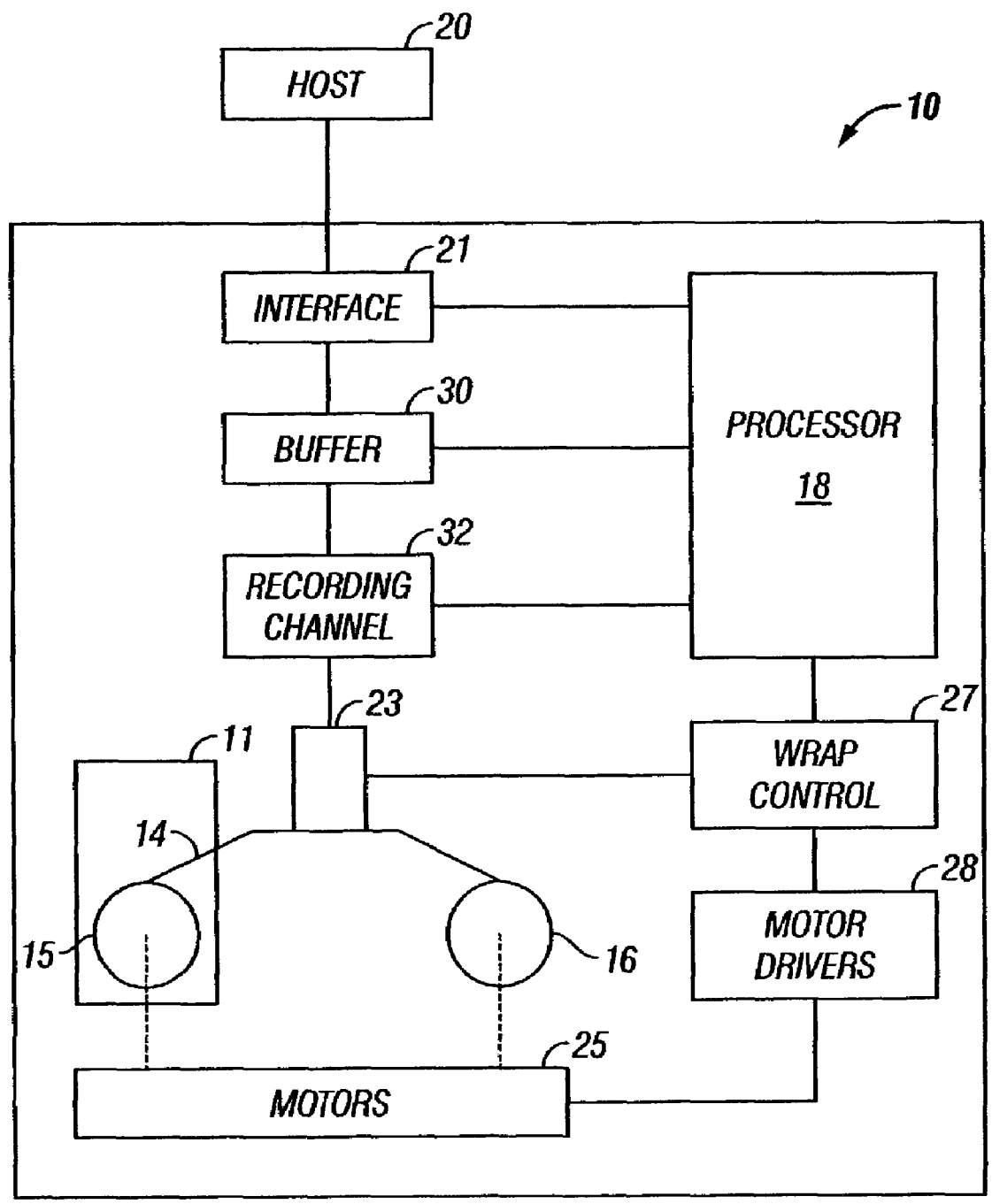
FIG. 1 is a block diagram of an embodiment of a magnetic tape data storage system with a magnetic tape, which magnetic tape data storage system implements the present invention.

Referring to FIG. 1, an embodiment of a magnetic tape data storage system 10 is illustrated which implements the present invention. The magnetic tape data storage system provides a means for reading and writing information with respect to a magnetic tape 14, which is provided, for example, by a cartridge 11. As a specific example, the illustrated cartridge and associated magnetic tape data storage system adhere to the Linear Tape Open (LTO) format. An example of a single reel tape drive is the IBM 3580 Ultrium magnetic tape drive based on LTO technology. A further example of a single reel tape drive and cartridge is such as that discussed in U.S. Pat. No. 5,432,652, Comeaux et al., issued Jul. 11, 1995. Another example of a single reel tape drive is the IBM 3590 Magstar magnetic tape drive and associated magnetic tape cartridge. An example of a dual reel cartridge is the IBM 3570 magnetic tape cartridge and associated drive. Tape drives may further comprise elements of a greater magnetic tape data storage system, such as an automated data storage library.

As is understood by those of skill in the art, a magnetic tape cartridge 11 comprises a length of magnetic tape 14 wound on one or two reels 15, 16. Also as is understood by those of skill in the art, a magnetic tape data storage system 10 comprises one or more processors 18 of a recording system for operating the magnetic tape data storage system in accordance with commands received from a host system 20 received at an interface 21. The tape drive may comprise a standalone unit or comprise a part of a tape library or other subsystem. The magnetic tape data storage system 10 may be coupled to the host system 20 directly, through a library, or over a network, and employ the Small Computer Systems Interface (SCSI), Fibre Channel Interface, etc.

The magnetic tape cartridge 11 may be inserted in the magnetic tape data storage system 10, and loaded by the magnetic tape data storage system so that one or more read and/or write heads 23 of the recording system reads and/or writes information with respect to the magnetic tape 14 as the tape is moved longitudinally by one or more motors 25. The magnetic tape comprises a plurality of parallel tracks, or groups of tracks. In some formats, such as the LTO format, discussed above, the tracks are arranged in a serpentine back and forth pattern of separate wraps, as is known to those of skill in the art. Also as known to those of skill in the art, the recording system comprises a wrap control system 27 to electronically switch to another set of read and/or write heads, and/or to seek and move the read and/or write heads 23 laterally of the magnetic tape, to position the heads at a desired wrap or wraps, and, in some embodiments, to track follow the desired wrap or wraps. The wrap control system may also control the operation of the motors 25 through motor drivers 28, both in response to instructions by the processor 18.

Processor 18 also provides the data flow and formatting of data to be read from and written to the magnetic tape, employing a sequential buffer 30 and a recording channel 32.

Figure 2:
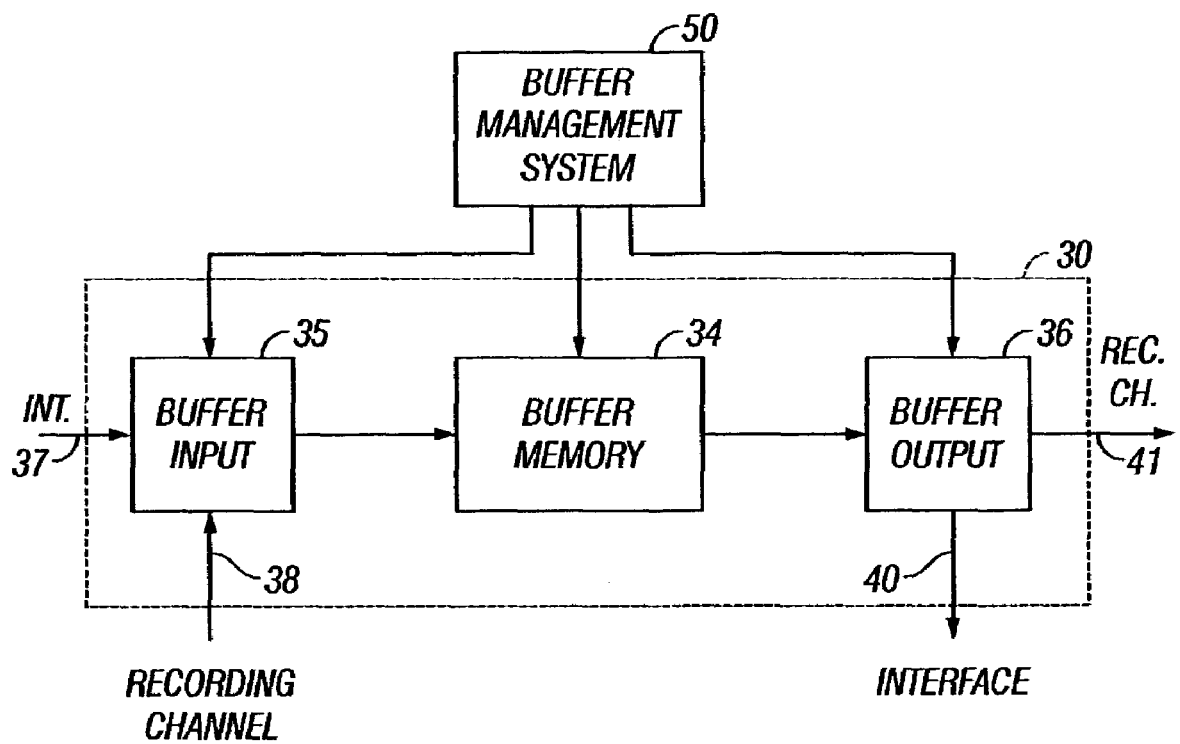
FIG. 2 is a block diagram of the buffer of FIG. 1 and buffer management system of the processor of FIG. 1 in accordance with an embodiment of the present invention.

In accordance with the present invention, the sequential buffer 30 is managed by a buffer management system. Referring additionally to FIG. 2, the buffer 30 comprises a buffer memory 34, a buffer input 35, and a buffer output 36. The buffer is sequential, in that the data is output on a FIFO (first in, first out) basis, as is understood by those of skill in the art. The buffer input 35 receives data from the interface 21 of FIG. 1, e.g., at input 37, or receives data from the recording channel 32 of FIG. 1, e.g., at input 38. The buffer output 36 supplies data to the interface 21 of FIG. 1, e.g., at output 40, or supplies data to the recording channel 32 of FIG. 1, e.g., at output 41. The buffer memory 34 is arranged to provide a plurality of addressable areas as is known to those of skill in the art, herein called "segments". In some arrangements, the segments may comprise a fixed size, for example, approximately 400K user bytes, which might be formatted out to 512K total bytes to provide magnetic tape formatting, but there is no fixed size requirement necessary to practice the present invention, and may alternatively be of variable size.

A buffer management system 50 of FIG. 2 manages operation of the buffer 30 in accordance with the present invention. The buffer management system may be implemented in the hardware and logic of the magnetic tape data storage system 10, may comprise a method, or may comprise a computer program product usable with a programmable computer having computer readable program code embodied therein, the computer program product comprising computer readable program code which operates a computer processor. The computer program product may be provided in a fixed or removable memory, such as a ROM, PROM, disk drive or diskette, associated with the processor 18, may be stored as a part of a database associated with the processor 18, or may be supplied externally, e.g., from host system 20, all as known to those of skill in the art.

The buffer management system 50 controls the operation of the buffer input 35 and the buffer output 36, and controls the storage of data in the buffer memory segments, in conducting data transfer processes for the magnetic tape data storage system. As one example, the storage of data may by controlled by the use of pointers, as is known to those of skill in the art.

Figure 3A:
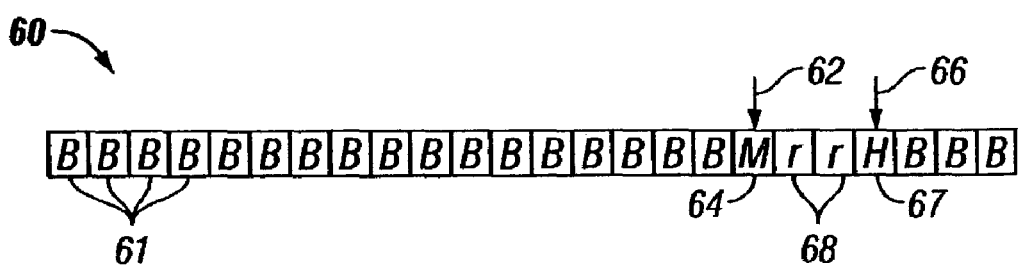
FIGS. 3A and 3B are diagrammatic illustrations of data of a buffer of a magnetic tape data storage system in accordance with the prior art.
Figure 3B:
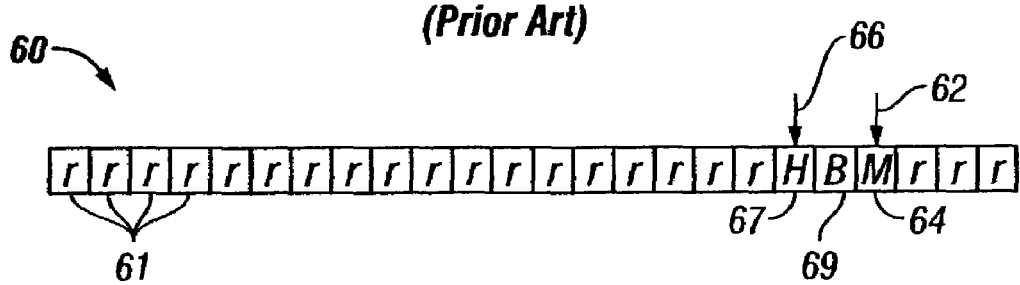

Referring to FIGS. 3A and 3B, the buffer is controlled employing pointers and buffer management as known in the prior art. The total amount of buffer space for storing data is referenced by the numeral 60, the buffer space arranged in segments, such as segments 61. The processes being conducted by the magnetic tape data storage system as depicted in FIG. 3A and in FIG. 3B comprise reading data from the magnetic tape 14 of FIG. 1, buffering that data in the sequential buffer 30, and supplying the buffered data to the host system 20. In FIGS. 3A and 3B, and in all subsequent buffer operation illustrations, the operation of the buffer is depicted as moving from the left to the right, and then wrapping back to the left end of the illustration, unless otherwise specified. The buffered data is not typically moved within the buffer, but the addresses where the data is buffered or read from the buffer are moved, typically with pointers. The transfer process comprises data which is transferred in any suitable form, herein called data "records", the size of which may or may not be related to the size of the buffer, and which may be variable or constant.

A pointer 62 designates a segment 64 into which data is being stored as it is read from the magnetic tape, and which is illustrated by the letter "M". Pointers typically point to an address of the buffer memory 34 of FIG. 2. Segments of the buffer 60 of FIGS. 3A and 3B which store data which has been read from the magnetic tape are illustrated by the letter "B". Another pointer 66 designates a segment 67 from which data is being supplied to the host, the data having been stored in the buffer, and having been read from the magnetic tape, which is illustrated by the letter "H". Segments 68 comprise data that has been supplied to the host and which segments are available to be overwritten, and are illustrated by the letter "r".

In FIG. 3A, the data is being read from the magnetic tape and stored in the buffer at a higher rate than the buffered data is being supplied to the host system, such that the pointer 62 is likely to nearly catch up with pointer 66 to the extent that a segment will be overwritten, like segment "M" 64, as soon as the data in that segment is supplied to the host system and released, so that there are effectively no segments in the state shown by "r" segments 68. However, as soon as there are no segments in the "r" state, the drive is forced to reposition, during which time the data in the buffer can be partially emptied, before data read from the tape again starts filling the data buffer.

If a subsequent process is conducted that is to start at the end of the data of the present process, the magnetic-tape data storage system is be required to move the magnetic tape backwards well beyond the point at which the present process ended, to a point where it may accelerate the magnetic tape in the forward direction to operational speed by the point required to reread the data, and then the magnetic tape data storage system conducts the subsequent process.

FIG. 3B illustrates a similar process, but in which the data is being supplied to the host system and segments released at a higher rate than the data is being read from the magnetic tape and stored in the buffer. Alternatively, FIG. 3B may illustrate the state of the buffer following a reposition when the host data rate is lower than the tape drive data rate but when the buffer is insufficient to hide that reposition. Most of the data segments still contain the data that has been supplied to the host and which segments are available to be overwritten, and are illustrated by the letter "r". Here, the pointer 66 is likely to catch up with pointer 62 to the extent that data buffered in a segment will supplied to the host system and released, like segment "H" 67, as soon as the data is read from the magnetic tape and buffered in a segment, such as segment "M" 64, and so that there are no, or only a minimum number of, segments in the state shown by "B" segments 69.

Figure 4A:
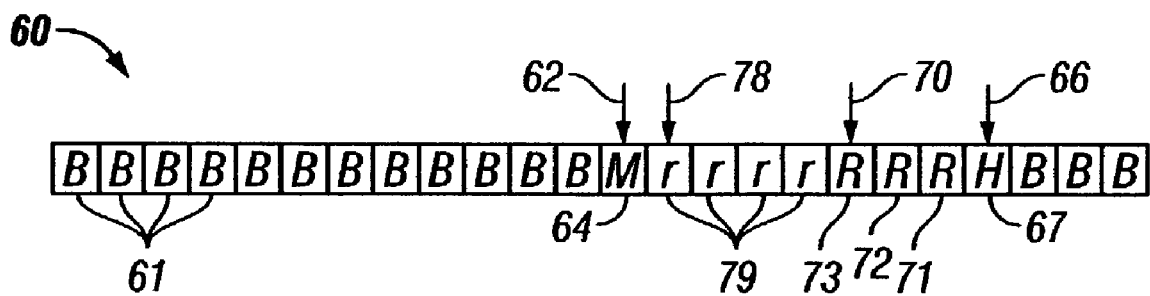
FIGS. 4A and 4B are diagrammatic illustrations of data of the buffer of FIG. 1 in accordance with an embodiment of the present invention.
Figure 4B:
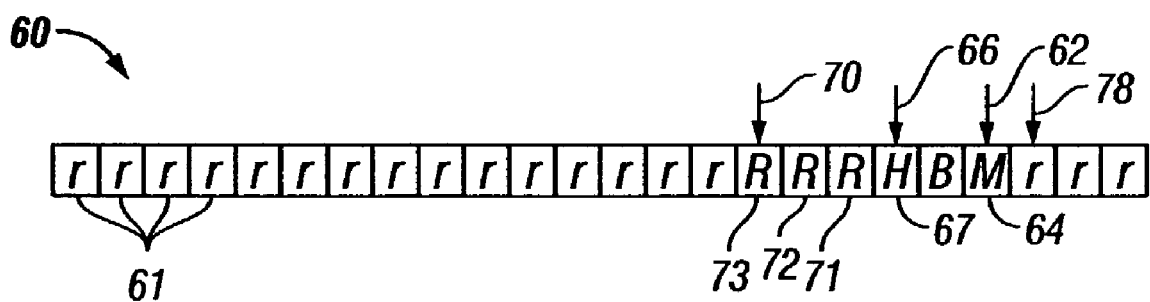

Referring to FIGS. 4A and 4B, in accordance with the present invention, at least one data record is buffered in the sequential buffer in at least one of the segments, as part of the magnetic tape data storage system conducting a transfer process transferring the at least one data record, and the buffer management system, for example, employing a pointer 70, maintains buffered data in at least one of the segments, for example, shown as segments 71, 72 and 73, such that the maintained buffered data of the segments is prevented from being overwritten while so maintained. FIG. 4A represents the new form of the buffer when conducting an operation similar to that of prior art FIG. 3A. In FIG. 3A, the next media blocks will overwrite segments 68 with read ahead data unless explicitly prevented from doing so, as is accomplished in accordance with the present invention as illustrated in FIG. 4A. FIG. 4B represents the new form of the buffer when conducting an operation similar to that of FIG. 3B. In FIG. 3B, the segments 61 from which the data has been read by the host are released or cleared, and will be overwritten by the next operation unless explicitly prevented from doing so, as is accomplished in accordance with the present invention as illustrated in FIG. 4B.

Herein, "H" stands for a segment actively being received from or sent to, the Host; "M" for a segment actively being read from, or written to, the Media (magnetic tape); "R" for segments having maintained read data; "W" for segments having maintained write data; "B" for data which is buffered; and "r" and "w" for segments having data which has been transferred and are available to be overwritten.

The maintaining of the buffered data may be ongoing during the transfer process, and the pointer 70 or other indicator moved as the transfer process progresses, as in FIG. 4A, or may be conducted at the end of the process by applying the pointer or other indicator, as in FIG. 4B. Thus, at least subsequent to the magnetic tape data storage system conducting the transfer process transferring at least one data record, the buffer management system maintains buffered data of the buffered at least one data record, in at least one of the segments 71, 72, 73 and less than all the segments of the buffer. Since the exemplary data transfer process comprises a read process, the segments 71, 72, 73 maintaining the buffered data are illustrated with the letter "R".

Then, in accordance with another aspect of the present invention, the buffer management system indicates that the maintained buffered data in segments 71, 72, 73, designated "R", comprises VALID data, for example, restoring the segments back to active read buffered status, whereby the data need not be read from the magnetic tape, but, instead, may be directly read from the sequential buffer.

Further, by maintaining buffered data in less than all the segments 60 of the sequential buffer, the buffer is available for conducting the subsequent process.

In another embodiment, referring to FIG. 4A, a pointer 78 is employed to the track segments 79 indicated as "r" whose data has been transferred to the host and are made available for overwriting, but which segments have not been overwritten. Alternatively, pointer 62 may be employed for this purpose. Any segment having such data can be restored to active status as VALID data, in addition to the segments having maintained data, if any. This can greatly increase the amount of data accessible by space backwards commands, for example, in the case of a buffer which is nearly empty of segments in the "B" state, such as illustrated by segments 61 of FIG. 4B, which are tracked by pointer 78. Further, the buffer may not be enabled to maintain buffered data, and segments 79 available for overwriting are tracked by pointer 78. In that instance, segments 71, 72, 73 would not be maintained, but would be tracked by pointer 78.

The amount of buffered data to be maintained may be a predetermined amount or variable. Herein, the amount of buffered data to be maintained is designated as the number of segments, which are defined above as addressable areas of the buffer memory.

The predetermined number of segments may comprise a function of the buffer size. An example might be less than 5% of the buffer size in the case of a buffer not much larger than that necessary to hide a reposition, or many times larger in the case of a bigger buffer. Thus, if the buffer memory 34 of FIG. 2 was 128 MB, the predetermined number of segments would amount to about 4 MB.

The variable number of segments may comprise a function of previous operations, or the current operation or process, or a combination. As examples, the variable number of segments may comprise the characterization of the data record(s), a function of the relative performance of the host system and the magnetic tape data storage system, a function of the frequency of previous backwards spacing operations, or a function of the length of previous backwards spacing operations.

As a specific example, in a write process, the data records may include one or more non-Immediate write filemarks to be written, which, in SCSI protocol, each requires that the buffer is flushed and all the data up to and including the filemark is written to magnetic tape, before any subsequent command can be received with more data for the buffer, as is known to those of skill in the art. If a large amount of data is maintained in the buffer, the characterization of a data record as a filemark would result in the release of some of the segments, reducing the number of segments to maintain buffered data to a minimum number of segments. An example might be approximately 5% of the buffer size with no filemarks present and a minimum of 1–1.5% of the buffer size with filemarks.

As another example, if the relative performance of the host system and the magnetic tape data storage system are such that data is output at a faster rate than input, leaving empty space in the buffer, such as shown in FIG. 4B, the number of segments to maintain buffered data may be expanded. Conversely, if the relative performance of the host system and the magnetic tape data storage system are such that data is available to be input at a faster rate than it is output, such that the buffer is full of data to be output, such as shown in FIG. 4A, the number of segments to maintain buffered data may be reduced.

As a further example, if backwards spacing operations have been performed frequently, the number of segments to maintain buffered data may be expanded. Conversely, if backwards spacing operations have been performed infrequently, or not at all, the number of segments to maintain buffered data might be reduced to a minimum level, perhaps even to zero.

Further, if there have been backwards spacing operations, the lengths of the preceding backwards spacing operations may be utilized to determine the variable number of segments to maintain buffered data.

Additionally, the variable number of segments varies up to a maximum number of segments determined as a function of the total number of the plurality of segments of the sequential buffer. For example, a maximum number of segments might be 5% of the buffer size.

Figure 5:
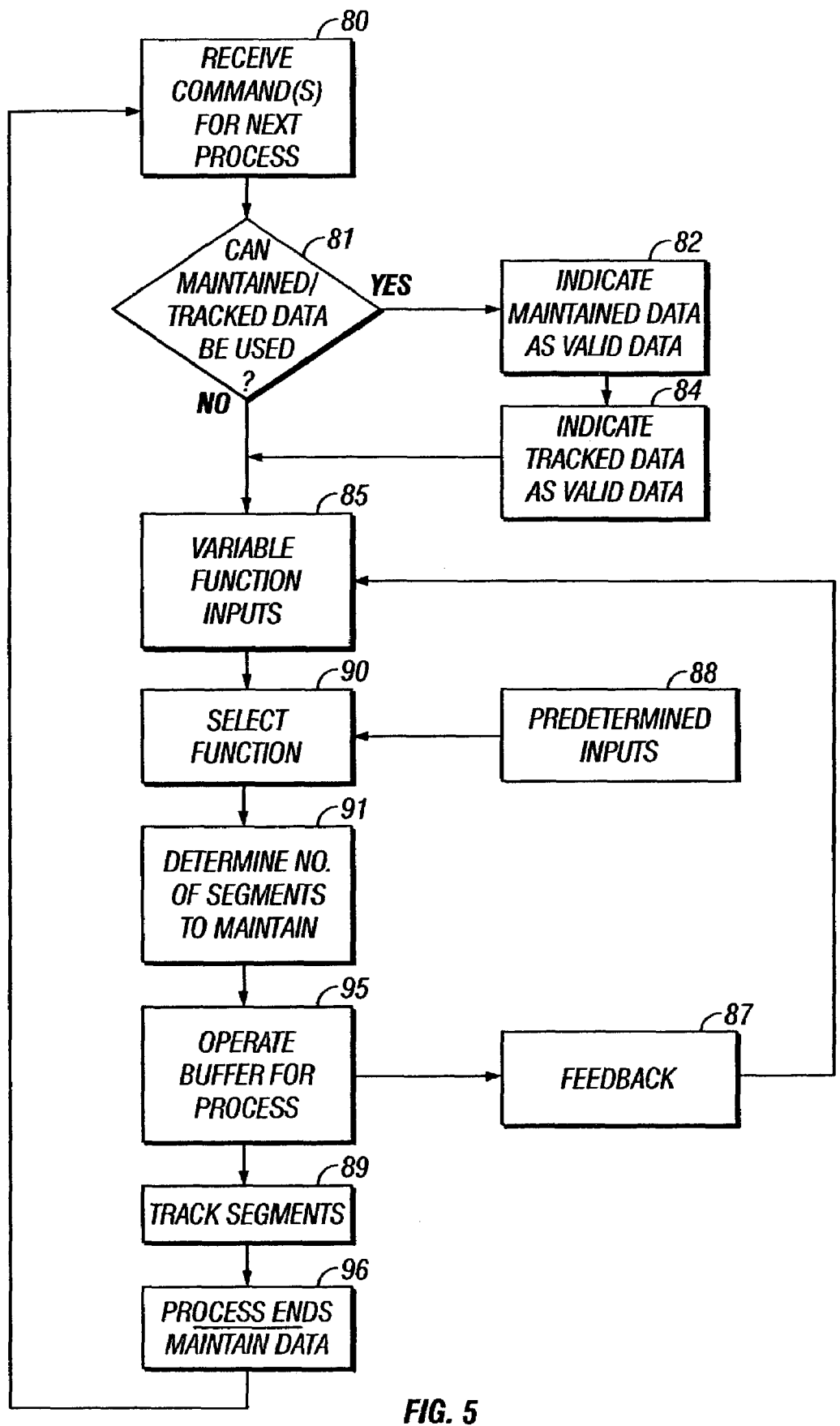
FIG. 5 is a flow chart depicting an embodiment of computer implemented methods of the present invention.

FIG. 5 illustrates embodiments of computer implemented methods of the present invention. A command or commands for the next process are received by the magnetic tape data storage system in step 80, switching from the previous process to the next, or present, process.

In step 81, a determination is made whether buffered data of the previous process can be used in the present process, if the previous process was a transfer process which maintained buffered data in segments of the buffer in accordance with the invention, such that the maintained buffered data is prevented from being overwritten while so maintained. For example, the present process may comprise a locate command following a write or read command, and the maintained buffered data may be directly used by the present process. As the result, the magnetic tape data storage system will not be required to move the media to a point where it would accelerate the magnetic tape to operational speed at the point required to read the data.

In another embodiment, step 81 additionally determines whether any tracked segments which are available for overwriting, and which have not been overwritten, exist, and whether the data of the tracked segments can be used by the present process.

If step 81 determines that the maintained buffered data can be used by the present process, "YES", in step 82, the buffer management system indicates that the maintained buffered data of the at least one of the segments, comprises VALID data, whereby the data need not be read from the magnetic tape.

In another embodiment, if step 81 determines that tracked segments, perhaps including segments having maintained buffered data, exist, and that the tracked data can be used by the present process, in step 84, the buffer management system indicates that the data of at least one of the tracked segments, comprises VALID data. In step 81, if the buffer is not enabled to maintain buffered data, only segments available for overwriting are tracked and may be indicated as VALID data in step 84.

The buffer management system then determines the number of segments of buffered data to maintain in the present transfer process, beginning at step 85, in which the inputs to the variable functions are provided. The inputs may be related to previous operations, obtained from a feedback step 87, or the current operation or process, or a combination, as discussed above. As examples, the variable number of segments may comprise the characterization of the data record(s), a function of the relative performance of the host system and the magnetic tape data storage system, a function of the frequency of previous backwards spacing operations, or a function of the length of previous backwards spacing operations. The predetermined inputs are provided a step 88. As examples, the predetermined inputs may comprise maximum or minimum numbers of segments for the variable number of segments; or may comprise the predetermined number of segments, which may be a function of the buffer size, also as discussed above.

If the implementation allows a selection between various functions, or between one or more variable number of segments functions and a predetermined number of segments, step 90 comprises a selection of the function, or the combination, to determine the number of buffered data segments to be maintained in step 91. If only one function is to be employed, step 91 may be omitted. Similarly, if only a predetermined number of segments are used to maintain buffered data, steps 85, 87, 88 and 90 may be omitted.

Thus, with the selected function, step 91 determines the number of segments with which to maintain buffered data. Also, the number of segments, if variable, may be varied during the process in accordance with the function.

In step 95, the buffer management system operates the buffer for the process received in step 80, and step 87 provides any feedback from that process for the variable function inputs.

During the operation of the sequential buffer for the process, buffered data may be maintained on an ongoing basis in the determined number of the segments, for example, by use of a pointer 70 of FIG. 4, which moves as the process sequences from left to right through the segments of the buffer 60.

In another embodiment, segments are tracked, in step 89, whose data has been transferred and are made available for overwriting, but which segments have not been overwritten. That data may be re-enabled as VALID data in step 84. In one embodiment, the buffer is not enabled to maintain buffered data, skipping steps 91 and 96 such that only segments available for overwriting are tracked in step 89.

Then, at least subsequent to the magnetic tape data storage system conducting the transfer process transferring at least one data record, in step 96, the buffer management system maintains buffered data of the buffered at least one data record, in at least one of the segments, and less than all the segments of the buffer, up to the number designated in step 91, if any, such that the maintained buffered data is prevented from being overwritten while so maintained. The system is then ready to proceed to the next process in step 80, with the buffered data of the previous process maintained in the determined number of segments of the buffer 60. Upon the magnetic tape data storage system switching from the transfer process to another process in step 80, the buffer management system, in step 82, indicates that the maintained buffered data comprises VALID data, whereby the data need not be read from the magnetic tape. Instead, the subsequent process may be conducted, and directly use the data maintained in the buffer. As the result, the magnetic tape data storage system will not be required to move the media to a point where it would accelerate the magnetic tape to operational speed at the point required to read the data. Further, by maintaining buffered data in less than all the segments of the buffer, the buffer is available for conducting the subsequent process.

Figure 6:
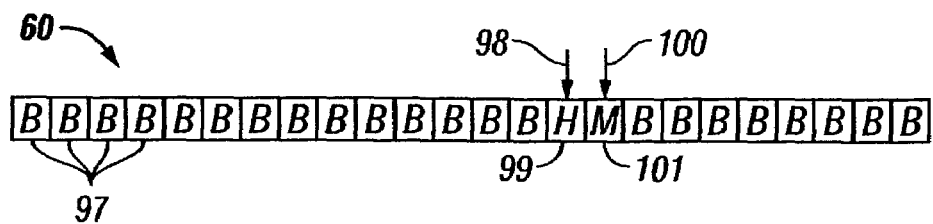
FIG. 6 is a diagrammatic illustration of data of a buffer of a magnetic tape data storage system in accordance with the prior art in a write process.
Figure 7:
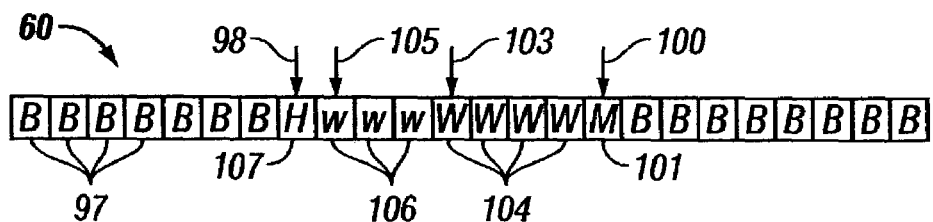
FIG. 7 is a diagrammatic illustration of data of the buffer of FIG. 1 in accordance with an embodiment of the present invention in a write process.
Figure 8:
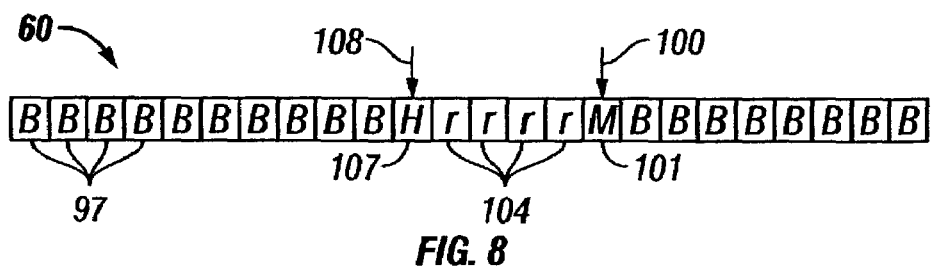
FIG. 8 is a diagrammatic illustration of use of the data of the buffer of FIG. 7.

FIGS. 6, 7 and 8 illustrate, respectively, data of a buffer of a magnetic tape data storage system in accordance with the prior art in a write process, the data of the buffer in accordance with an embodiment of the present invention in the same write process, and use of the data of the buffer of FIG. 7 for error recovery after a permanent error.

FIG. 6 illustrates a write process in which the data is being supplied by the host system at a rate at least as high as the rate that the buffered data is being written to the magnetic tape and segments 97 of the buffer 60 are released for buffering more data from the host. Thus, most of the data segments contain buffered data that has been supplied by the host and which segments, when released, are immediately overwritten, and are illustrated by the letter "B". Here, the pointer 98 at segment 99 has caught up with pointer 100 at segment 101 the extent that any segment released when the buffered data is written to magnetic tape, such as segment "M" 101, becomes available, it is immediately overwritten by the host, such as segment "H" 99, and so that there are no segments having data that has been already completely written.

Referring to FIG. 7, in accordance with the present invention, at least one data record is buffered in the sequential buffer in at least one of the segments, as part of the magnetic tape data storage system conducting a transfer process transferring the at least one data record by writing the data to magnetic tape, and the buffer management system, for example, employing a pointer 103, maintains buffered data that had been written to magnetic tape in at least one of the segments, for example, shown as segments 104, such that the maintained buffered data of the segments is prevented from being overwritten while so maintained. The pointer 98 now points to segment 107 for the host to supply data to the buffer.

Thus, if there is a permanent error that is discovered in the data that has just been written to magnetic tape, no "good data" remains in the buffer of the prior art process of FIG. 6. In contrast, the buffer of FIG. 7 has maintained buffered data in a number of the segments 104, and prevented that data from being overwritten. Hence, if the next process is a recovery action to recover and restore the just written data, that data is converted to VALID data in accordance with the present invention, as shown in FIG. 8 in segments 104, and is available for the recovery process. In this example, the amount of data that is maintained may be tied to the present record size (typically no larger than 16 mb), or the amount of data sent since the last synchronizing event.

In another embodiment, referring to FIG. 7, a pointer 105 is employed to track segments 106 indicated as "w" whose data has been transferred to the media and are made available for overwriting, but which segments have not been overwritten. Alternatively, pointer 98 may be used for this purpose. Any segment having such data can be restored to active status as VALID data, in a addition to the segments having maintained data, if any. Further, the buffer may not be enabled to maintain buffered data, and segments 106 available for overwriting are tracked by pointer 105. In that instance, segments 104 would not be maintained, but would be tracked by pointer 105.

The host system may perform small file or trailer operations on data just written or just read. For example, a host may be writing a small transaction, then, another one is processed, which may involve examining part of the previous entity. A repetitive sequence may result as follows:
W1) Space backwards to volume trailer
W2) Read volume trailer
W3) Space backwards to last transaction header
W4) Read header
W5) Space to trailer
W6) Read trailer
W7) Write new transaction
W8) Write trailer, etc.

Maintaining buffered data in the buffer in accordance with the present invention allows this, W1–W6, to be done without any magnetic tape read operations, and write operations only are conducted.

This becomes even more efficient with read processing only, where distinct host transaction processing may involve:
R1) Space backwards to last transaction trailer
R2) Read trailer
R3) Read header of this transaction
R4) Read transaction
R5) Read trailer, etc.

Figure 9A:
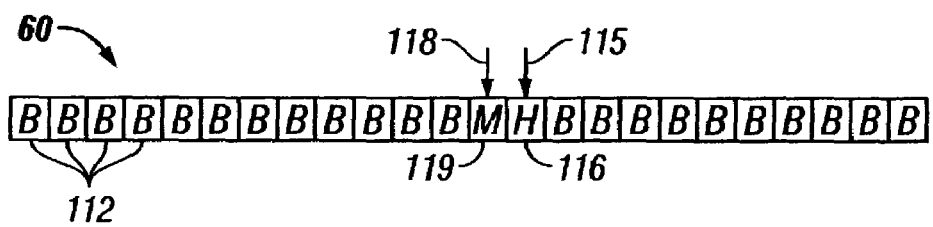
FIGS. 9A, 9B, 9C and 9D are diagrammatic illustrations of data of a buffer of a magnetic tape data storage system in accordance with the prior art.

FIGS. 9A, 9B, 9C and 9D illustrate a read process in which the data is being read by the magnetic tape data storage system and buffered, and the buffered data is being transferred to the host system. The read and buffered data is designated by the letter "B". In FIG. 9A the data is being read and buffered from the magnetic tape at a rate at least as high as the rate that the buffered data is being transferred to the host system and segments 112 of the buffer 60 are released for buffering more data from the magnetic tape. Thus, most of the data segments contain buffered data that has been supplied by the host and which segments, when released, are immediately overwritten. Here, the pointer 118 at segment 119 has caught up with pointer 115 at segment 116, to the extent that any segment released when the buffered data "B" is supplied to the host system, such as segment "H" 116, is immediately overwritten by the magnetic tape data storage system, such as segment "M" 119, and so that there are no segments having data that has been read.

Figure 9B:
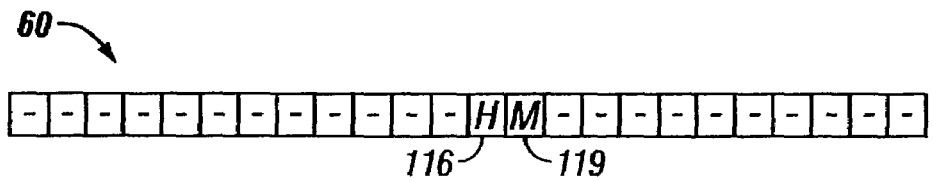

To conduct step "R1", above, in the prior art, the magnetic tape data storage system must reposition the magnetic tape backwards to a position backwards of the last transaction trailer. If the magnetic tape data storage system has been conducting the read operation on a read ahead basis (which is a normal basis of operation), the magnetic tape is a considerable distance from the position backwards of the last transaction trailer that has been supplied to the host. This is seen from the buffer 60, which is full of buffered data "B" that has been read from the magnetic tape. When the magnetic tape is repositioned, the buffer is emptied, as is shown in FIG. 9B.

Figure 9C:
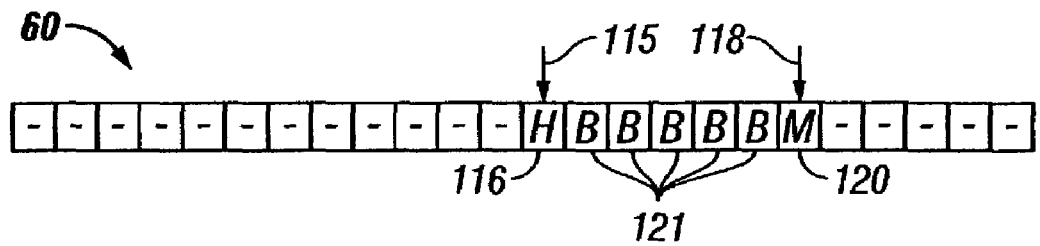

After the magnetic tape is repositioned, it is accelerated to a speed such that the magnetic tape data storage system may read the trailer, step "R2", and read the header of this transaction, step "R3". The magnetic tape data storage system then, as shown in FIG. 9C, then resumes the read ahead process, moving pointer 118 to segment 120, and providing read buffered data at segments 121 of buffer 60.

Figure 9D:
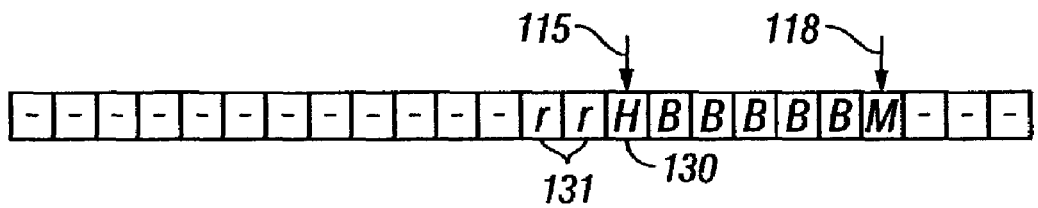

Then, in FIG. 9D, the host system begins to receive the data from the buffer 60, as indicated by moving pointer 115 to segment 130, leaving read data that may be overwritten in segments 131.

Time consuming backwards motion of the magnetic tape may be eliminated by maintaining buffered data in a number of segments of the buffer in accordance with the present invention.

Figure 10:
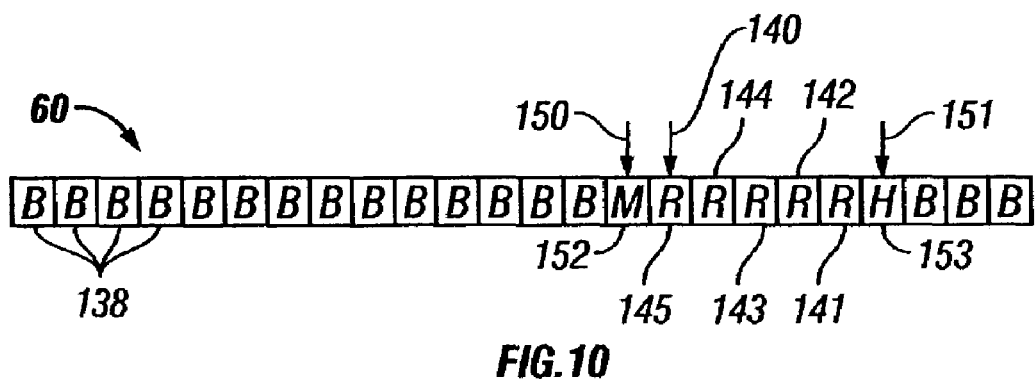
FIG. 10 is a diagrammatic illustration of data of the buffer of FIG. 1 in accordance with an embodiment of the present invention.

FIG. 10 illustrates the new read process when conducting an operation similar to that of prior art FIG. 3A, or of FIG. 9A where the catch up has occurred, but conducted in accordance with the present invention. In FIG. 10, the read process is one in which the data is being read by the magnetic tape data storage system and buffered, as shown by pointer 150, the segment is indicated as "M" for data being read from the magnetic tape, and the buffered data is being transferred to the host system, as shown by pointer 151, the segment is indicated as "H" for buffered data being transferred to the host system. The data is being read and buffered from the magnetic tape at a rate at least as high as the rate that the buffered data is being transferred to the host system and segments 138 of the buffer 60 are released for buffering more data from the magnetic tape. However, in accordance with the present invention, the buffer management system maintains buffered data in at least one of the segments, and less than all the segments of the buffer, such that the maintained buffered data is prevented from being overwritten while so maintained, as is illustrated by pointer 140 and segments 141, 142, 143, 144 and 145, which are illustrated with the oldest data segment having the highest numerical reference. The pointer 150 at segment 152 represents the read ahead process, and has caught up with pointer 140 at segment 145, and is prevented from overwriting the maintained buffered segment.

Figure 11A:
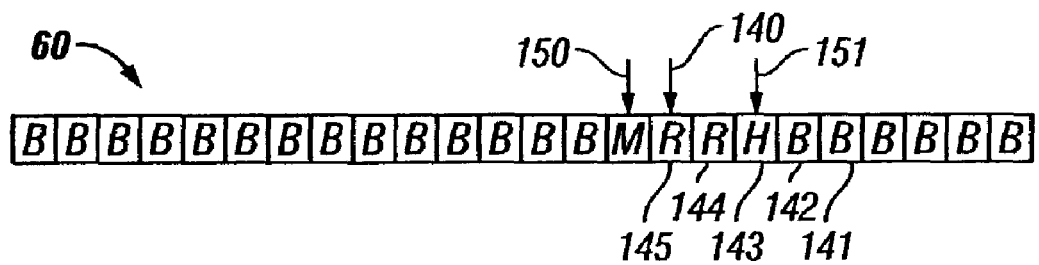
FIGS. 11A and 11B are diagrammatic illustrations of the buffer of FIG. 1 in the use of the data of the buffer of FIG. 10.

As shown by FIG. 11A, to conduct step "R1", above, the magnetic tape data storage system is not required to reposition the magnetic tape backwards as in the prior art. Rather, the buffer management system, upon the magnetic tape data storage system switching from the transfer process to the process of step "R1", indicates the maintained buffered data of the at least one of the segments, comprises VALID data, and logically repositions the host backwards to the desired segment containing the last transaction trailer, as shown by pointer 151 being repositioned at segment 143. The maintained buffered data is indicated as VALID and is designated by the letter "B" as still buffered.

Hence, as shown by FIG. 11B, the data may be again sent to the host in accordance with step "R2", etc., as shown by the movement of pointer 151 in the forward direction. All the while, in both FIG. 11A and in FIG. 11B, pointer 140 prevents the read ahead function of the magnetic tape data storage system from overwriting the maintained data. Once the number of segments maintaining buffered data again reaches the determined number of segments, pointer 140 moves forward and allows the read ahead process to continue from the previous point.

Figure 11B:
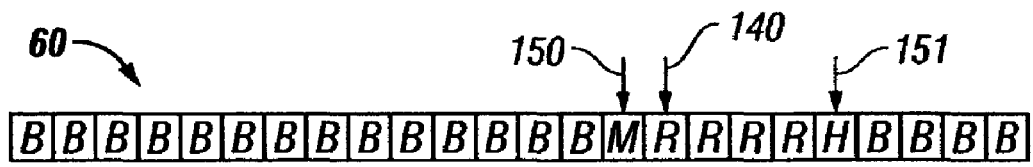
Figure 12:
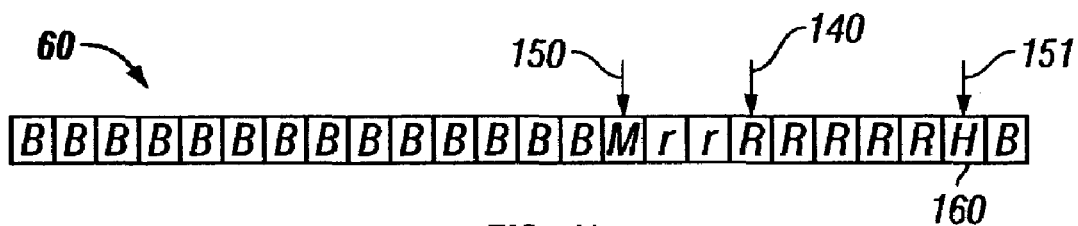
FIG. 12 is a diagrammatic illustration of further use of the data of FIGS. 11A and 11B.

FIG. 12 represents a potential step which may follow that shown in FIGS. 11A and 11B in which the host conducts a "space forward" operation, jumping to the data at segment 160, which, because the data remains in the buffer, is available, is accessed logically by the buffer management system.

Figure 13:
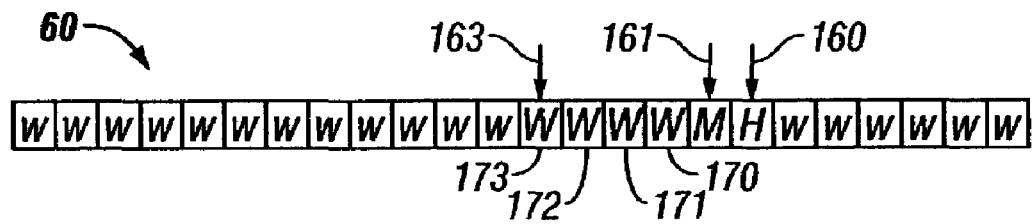
FIG. 13 is a diagrammatic illustration of data of the buffer of FIG. 1 in accordance with an embodiment of the present invention.

FIG. 13 illustrates a write process in which the data is being supplied by the host system, as indicated by pointer 160, and the segment indicated by the letter "H", and the magnetic tape data storage system is writing the data to the magnetic tape, as indicated by pointer 161, and indicated by the letter "M". In accordance with the present invention, a buffered data is maintained in a number of segments 170, 171, 172 and 173, and indicated by pointer 163. The remaining data that has been written and not maintained may be overwritten, and is designated by the letter "w".

Figure 14:
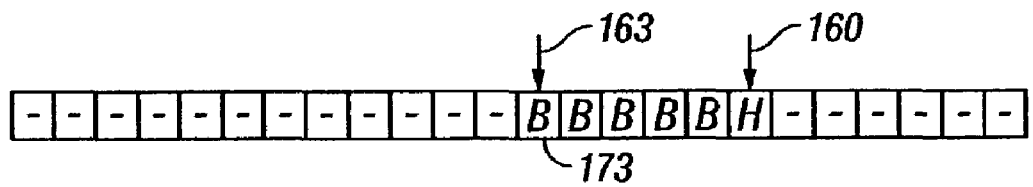
FIG. 14 is a diagrammatic illustration of the buffer of FIG. 1 in the use of the data of the buffer of FIG. 13.

The host system, in the next process, may wish to read the data that has just been written. In the prior art, that data would have been made available for overwriting and would not be valid. However, in accordance with the present invention, some or all of the data has been maintained and is prevented from being overwritten. In FIG. 14, the buffer management system, upon the magnetic tape data storage system switching from the transfer process to the backwards read process, indicates the maintained buffered data of the at least one of the segments, comprises VALID data, and the maintained buffered data, now VALID for backwards reading is designated by the letter "B" as buffered. The host pointer for the read operation then moves from right to left in the buffer 60, and pointer 163 indicates that segment 173 represents the last of the maintained data for backwards read back.

The illustrated components of the magnetic tape data storage tape system 10 of FIG. 1, and the components of the buffer management system of FIG. 2 may be varied, combined, or combined functions may be separated, as is known to those of skill in the art. The illustrated steps of FIG. 5 may be altered in sequence, omitted, or other steps added, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. A buffer system for a magnetic tape data storage system, said magnetic tape data storage system for transferring data with respect to magnetic tape for writing and reading data on magnetic tape, said buffer system comprising:
   a sequential buffer comprising a plurality of segments; and
   a buffer management system, said buffer management system:
      buffering at least one data record in said sequential buffer in at least one of said segments, as part of said magnetic tape data storage system conducting a transfer process transferring said at least one data record; and
      at least subsequent to said magnetic tape data storage system conducting said transfer process transferring at least one data record, maintaining buffered data of said buffered at least one data record, in at least one of said segments, and less than all said segments of said buffer, such that said maintained buffered data is prevented from being overwritten while so maintained.

2. The buffer system of claim 1, wherein said buffer management system maintains said buffered data of said buffered at least one data record, in a predetermined number of segments of said sequential buffer.

3. The buffer system of claim 2, wherein said predetermined number of maintained segments of said buffered at least one data record, comprises a number of segments related to the total number of said plurality of segments of said sequential buffer.

4. The buffer system of claim 1, wherein said buffer management system identifies said maintained buffered data of said at least one of said segments, with a segment pointer.

5. A buffer system for a magnetic tape data storage system, said magnetic tape data storage system for transferring data with respect to magnetic tape for writing and reading data on magnetic tape, said buffer system comprising:
   a sequential buffer comprising a plurality of segments; and
   a buffer management system, said buffer management system:
      buffering at least one data record in said sequential buffer in at least one of said segments, as part of said magnetic tape data storage system conducting a transfer process transferring said at least one data record;
      at least subsequent to said magnetic tape data storage system conducting said transfer process transferring at least one data record, maintaining buffered data of said buffered at least one data record, in at least one of said segments, and less than all said segments of said buffer, such that said maintained buffered data is prevented from being overwritten while so maintained; and
      indicating said maintained buffered data of said at least one of said segments, comprises VALID data, whereby said data need not be read from said magnetic tape.

6. A buffer system for a magnetic tape data storage system, said magnetic tape data storage system for transferring data with respect to magnetic tape for writing and reading data on magnetic tape, said buffer system comprising:
   a sequential buffer comprising a plurality of segments; and
   a buffer management system, said buffer management system:
      buffering at least one data record in said sequential buffer in at least one of said segments, as part of said magnetic tape data storage system conducting a transfer process transferring said at least one data record;

at least subsequent to said magnetic tape data storage system conducting said transfer process transferring at least one data record, maintaining buffered data of said buffered at least one data record, in at least one of said segments, and less than all said segments of said buffer, such that said maintained buffered data is prevented from being overwritten while so maintained; and indicating said maintained buffered data of said at least one of said segments, comprises VALID data, whereby said data need not be read from said magnetic tape;

additionally:

upon a command for said magnetic tape data storage system to conduct a backwards spacing and forward read operation, instead provides at least some of said maintained buffered data of said at least one of said segments.

7. A buffer system for a magnetic tape data storage system, said magnetic tape data storage system for transferring data with respect to magnetic tape for writing and reading data on magnetic tape, said buffer system comprising:

a sequential buffer comprising a plurality of segments; and a buffer management system, said buffer management system:

buffering at least one data record in said sequential buffer in at least one of said segments, as part of said magnetic tape data storage system conducting a transfer process transferring said at least one data record;

at least subsequent to said magnetic tape data storage system conducting said transfer process transferring at least one data record, maintaining buffered data of said buffered at least one data record, in at least one of said segments, and less than all said segments of said buffer, such that said maintained buffered data is prevented from being overwritten while so maintained; and indicating said maintained buffered data of said at least one of said segments, comprises VALID data, whereby said data need not be read from said magnetic tape;

additionally:

upon a command for said magnetic tape data storage system to conduct a backwards read operation, instead provides at least some of said maintained buffered data of said at least one of said segments.

8. A buffer system for a magnetic tape data storage system, said magnetic tape data storage system for transferring data with respect to magnetic tape for writing and reading data on magnetic tape, said buffer system comprising:

a sequential buffer comprising a plurality of segments; and a buffer management system, said buffer management system:

buffering at least one data record in said sequential buffer in at least one of said segments, as part of said magnetic tape data storage system conducting a transfer process transferring said at least one data record; and at least subsequent to said magnetic tape data storage system conducting said transfer process transferring at least one data record, maintaining buffered data of said buffered at least one data record, in a variable number of said segments less than all said segments of said buffer, such that said maintained buffered data is prevented from being overwritten while so maintained.

9. The buffer system of claim 8, wherein said variable number of segments of said buffered at least one data record maintained by said buffer management system, comprises a number of segments determined as a function of the characterization of said at least one data record.

10. The buffer system of claim 8, wherein said transfer process additionally transfers said data with respect to a host system, and wherein said variable number of segments of said buffered at least one data record maintained by said buffer management system, comprises a number of segments determined as a function of the performance of said host system as compared to the performance of said magnetic tape data storage system.

11. The buffer system of claim 8, wherein said transfer process additionally transfers said data with respect to a host system, and wherein said variable number of segments of said buffered at least one data record maintained by said buffer management system, comprises a number of segments determined as a function of the frequency of preceding backwards spacing operations conducted with respect to said magnetic tape data storage system by said host system.

12. The buffer system of claim 8, wherein said transfer process additionally transfers said data with respect to a host system, and wherein said variable number of segments of said buffered at least one data record maintained by said buffer management system, comprises a number of segments determined as a function of the lengths of preceding backwards spacing operations conducted with respect to said magnetic tape data storage system by said host system.

13. The buffer system of claim 8, wherein said variable number of segments of said buffered at least one data record maintained by said buffer management system, varies up to a maximum number of segments determined as a function of the total number of said plurality of segments of said sequential buffer.

14. A buffer system for a magnetic tape data storage system, said magnetic tape data storage system for transferring data with respect to magnetic tape for writing and reading data on magnetic tape, said buffer system comprising:

a sequential buffer comprising a plurality of segments; and a buffer management system, said buffer management system:

buffering at least one data record in said sequential buffer in at least one of said segments, as part of said magnetic tape data storage system conducting a transfer process transferring said at least one data record;

at least subsequent to said magnetic tape data storage system conducting said transfer process transferring at least one data record, maintaining buffered data of said buffered at least one data record, in a variable number of said segments less than all said segments of said buffer, such that said maintained buffered data is prevented from being overwritten while so maintained; and upon said magnetic tape data storage system switching from said transfer process to another process, indicating said maintained buffered data of said variable number of said segments, comprises VALID data, whereby said data need not be read from said magnetic tape.

15. A buffer system for a magnetic tape data storage system, said magnetic tape data storage system for transferring data with respect to magnetic tape for writing and reading data on magnetic tape, said buffer system comprising:
- a sequential buffer comprising a plurality of segments; and
- a buffer management system, said buffer management system:
  - buffering at least one data record in said sequential buffer in at least one of said segments, as part of said magnetic tape data storage system conducting a transfer process transferring said at least one data record;
  - at least subsequent to said magnetic tape data storage system conducting said transfer process transferring at least one data record, maintaining buffered data of said buffered at least one data record, in a variable number of said segments less than all said segments of said buffer, such that said maintained buffered data is prevented from being overwritten while so maintained; and
  - upon said magnetic tape data storage system switching from said transfer process to another process, indicating said maintained buffered data of said variable number of said segments, comprises VALID data, whereby said data need not be read from said magnetic tape;
  - additionally:
  - upon a command for said magnetic tape data storage system to conduct a backwards spacing and forward read operation, instead provides at least some of said maintained buffered data of said at least one of said segments.

16. A buffer system for a magnetic tape data storage system, said magnetic tape data storage system for transferring data with respect to magnetic tape for writing and reading data on magnetic tape, said buffer system comprising:
- a sequential buffer comprising a plurality of segments; and
- a buffer management system, said buffer management system:
  - buffering at least one data record in said sequential buffer in at least one of said segments, as part of said magnetic tape data storage system conducting a transfer process transferring said at least one data record;
  - at least subsequent to said magnetic tape data storage system conducting said transfer process transferring at least one data record, maintaining buffered data of said buffered at least one data record, in a variable number of said segments less than all said segments of said buffer, such that said maintained buffered data is prevented from being overwritten while so maintained; and
  - upon said magnetic tape data storage system switching from said transfer process to another process, indicating said maintained buffered data of said variable number of said segments, comprises VALID data, whereby said data need not be read from said magnetic tape;
  - additionally:
  - upon a command for said magnetic tape data storage system to conduct a backwards read operation, instead provides at least some of said maintained buffered data of said at least one of said segments.

17. A magnetic tape data storage system, comprising:
- at least one magnetic head for writing and reading data on magnetic tape;
- a drive mechanism for moving a magnetic tape relative to said at least one magnetic head;
- a sequential buffer comprising a plurality of segments; and
- a control processor for operating said drive mechanism, said at least one magnetic head, and said sequential buffer for transferring data with respect to magnetic tape for writing and reading data on magnetic tape, said control processor:
  - buffering at least one data record in said sequential buffer in at least one of said segments, as part of said magnetic tape drive conducting a transfer process transferring said at least one data record; and
  - at least subsequent to said magnetic tape data storage system conducting said transfer process transferring at least one data record, maintaining buffered data of said buffered at least one data record, in at least one of said segments, and less than all said segments of said buffer, such that said maintained buffered data is prevented from being overwritten while so maintained.

18. The magnetic tape data storage system of claim 17, wherein said control processor maintains said buffered data of said buffered at least one data record, in a predetermined number of segments of said sequential buffer.

19. The magnetic tape data storage system of claim 18, wherein said predetermined number of maintained segments of said buffered at least one data record, comprises a number of segments related to the total number of said plurality of segments of said sequential buffer.

20. The magnetic tape data storage system of claim 17, wherein said control processor identifies said maintained buffered data of said at least one of said segments, with a segment pointer.

21. A magnetic tape data storage system, comprising:
- at least one magnetic head for writing and reading data on magnetic tape;
- a drive mechanism for moving a magnetic tape relative to said at least one magnetic head;
- a sequential buffer comprising a plurality of segments; and
- a control processor for operating said drive mechanism, said at least one magnetic head, and said sequential buffer for transferring data with respect to magnetic tape for writing and reading data on magnetic tape, said control processor:
  - buffering at least one data record in said sequential buffer in at least one of said segments, as part of said magnetic tape drive conducting a transfer process transferring said at least one data record;
  - at least subsequent to said magnetic tape data storage system conducting said transfer process transferring at least one data record, maintaining buffered data of said buffered at least one data record, in at least one of said segments, and less than all said segments of said buffer, such that said maintained buffered data is prevented from being overwritten while so maintained; and
  - indicating said maintained buffered data of said at least one of said segments, comprises VALID data, whereby said data need not be read from said magnetic tape.

22. A magnetic tape data storage system, comprising:
at least one magnetic head for writing and reading data on magnetic tape;
a drive mechanism for moving a magnetic tape relative to said at least one magnetic head;
a sequential buffer comprising a plurality of segments; and
a control processor for operating said drive mechanism, said at least one magnetic head, and said sequential buffer for transferring data with respect to magnetic tape for writing and reading data on magnetic tape, said control processor:
 buffering at least one data record in said sequential buffer in at least one of said segments, as part of said magnetic tape drive conducting a transfer process transferring said at least one data record;
 at least subsequent to said magnetic tape data storage system conducting said transfer process transferring at least one data record, maintaining buffered data of said buffered at least one data record, in at least one of said segments, and less than all said segments of said buffer, such that said maintained buffered data is prevented from being overwritten while so maintained; and
 indicating said maintained buffered data of said at least one of said segments, comprises VALID data, whereby said data need not be read from said magnetic tape;
additionally:
upon a command for said magnetic tape data storage system to conduct a backwards spacing and forward read operation, instead provides at least some of said maintained buffered data of said at least one of said segments.

23. A magnetic tape data storage system, comprising:
at least one magnetic head for writing and reading data on magnetic tape;
a drive mechanism for moving a magnetic tape relative to said at least one magnetic head;
a sequential buffer comprising a plurality of segments; and
a control processor for operating said drive mechanism, said at least one magnetic head, and said sequential buffer for transferring data with respect to magnetic tape for writing and reading data on magnetic tape, said control processor:
 buffering at least one data record in said sequential buffer in at least one of said segments, as part of said magnetic tape drive conducting a transfer process transferring said at least one data record;
 at least subsequent to said magnetic tape data storage system conducting said transfer process transferring at least one data record, maintaining buffered data of said buffered at least one data record, in at least one of said segments, and less than all said segments of said buffer, such that said maintained buffered data is prevented from being overwritten while so maintained; and
 indicating said maintained buffered data of said at least one of said segments, comprises VALID data, whereby said data need not be read from said magnetic tape;
additionally:
upon a command for said magnetic tape data storage system to conduct a backwards read operation, instead provides at least some of said maintained buffered data of said at least one of said segments.

24. A magnetic tape data storage system, comprising:
at least one magnetic head for writing and reading data on magnetic tape;
a drive mechanism for moving a magnetic tape relative to said at least one magnetic head;
a sequential buffer comprising a plurality of segments; and
a control processor for operating said drive mechanism, said at least one magnetic head, and said sequential buffer for transferring data with respect to magnetic tape for writing and reading data on magnetic tape, said control processor:
 buffering at least one data record in said sequential buffer in at least one of said segments, as part of said magnetic tape drive conducting a transfer process transferring said at least one data record; and
 at least subsequent to said magnetic tape data storage system conducting said transfer process transferring at least one data record, maintaining buffered data of said buffered at least one data record, in a variable number of said segments less than all said segments of said buffer, such that said maintained buffered data is prevented from being overwritten while so maintained.

25. The magnetic tape data storage system of claim 24, wherein said variable number of segments of said buffered at least one data record maintained by said control processor, comprises a number of segments determined as a function of the characterization of said at least one data record.

26. The magnetic tape data storage system of claim 24, wherein said transfer process additionally transfers said data with respect to a host system, and wherein said variable number of segments of said buffered at least one data record maintained by said control processor, comprises a number of segments determined as a function of the performance of said host system as compared to the performance of said magnetic tape data storage system.

27. The magnetic tape data storage system of claim 24, wherein said transfer process additionally transfers said data with respect to a host system, and wherein said variable number of segments of said buffered at least one data record maintained by said control processor, comprises a number of segments determined as a function of the frequency of preceding backwards spacing operations conducted with respect to said magnetic tape data storage system by said host system.

28. The magnetic tape data storage system of claim 24, wherein said transfer process additionally transfers said data with respect to a host system, and wherein said variable number of segments of said buffered at least one data record maintained by said control processor, comprises a number of segments determined as a function of the lengths of preceding backwards spacing operations conducted with respect to said magnetic tape data storage system by said host system.

29. The magnetic tape data storage system of claim 24, wherein said variable number of segments of said buffered at least one data record maintained by said control processor, varies up to a maximum number of segments determined as a function of the total number of said plurality of segments of said sequential buffer.

30. A magnetic tape data storage system, comprising:
at least one magnetic head for writing and reading data on magnetic tape;
a drive mechanism for moving a magnetic tape relative to said at least one magnetic head;
a sequential buffer comprising a plurality of segments; and a control processor for operating said drive mechanism, said at least one magnetic head, and said sequential buffer for transferring data with respect to magnetic tape for writing and reading data on magnetic tape, said control processor:

buffering at least one data record in said sequential buffer in at least one of said segments, as part of said magnetic tape drive conducting a transfer process transferring said at least one data record;

at least subsequent to said magnetic tape data storage system conducting said transfer process transferring at least one data record, maintaining buffered data of said buffered at least one data record, in a variable number of said segments less than all said segments of said buffer, such that said maintained buffered data is prevented from being overwritten while so maintained; an indicating said maintained buffered data of said variable number of said of said segments, comprises VALID data, whereby said data need not be read from said magnetic tape.

31. A magnetic tape data storage system, comprising:

at least one magnetic head for writing and reading data on magnetic tape;

a drive mechanism for moving a magnetic tape relative to said at least one magnetic head;

a sequential buffer comprising a plurality of segments; and a control processor for operating said drive mechanism, said at least one magnetic head, and said sequential buffer for transferring data with respect to magnetic tape for writing and reading data on magnetic tape, said control processor:

buffering at least one data record in said sequential buffer in at least one of said segments, as part of said magnetic tape drive conducting a transfer process transferring said at least one data record;

at least subsequent to said magnetic tape data storage system conducting said transfer process transferring at least one data record, maintaining buffered data of said buffered at least one data record, in a variable number of said segments less than all said segments of said buffer, such that said maintained buffered data is prevented from being overwritten while so maintained; an indicating said maintained buffered data of said variable number of said of said segments, comprises VALID data, whereby said data need not be read from said magnetic tape;

additionally:

upon a command for said magnetic tape data storage system to conduct a backwards spacing and forward read operation, instead provides at least some of said maintained buffered data of said at least one of said segments.

32. A magnetic tape data storage system, comprising:

at least one magnetic head for writing and reading data on magnetic tape;

a drive mechanism for moving a magnetic tape relative to said at least one magnetic head;

a sequential buffer comprising a plurality of segments; and a control processor for operating said drive mechanism, said at least one magnetic head, and said sequential buffer for transferring data with respect to magnetic tape for writing and reading data on magnetic tape, said control processor:

buffering at least one data record in said sequential buffer in at least one of said segments, as part of said magnetic tape drive conducting a transfer process transferring said at least one data record;

at least subsequent to said magnetic tape data storage system conducting said transfer process transferring at least one data record, maintaining buffered data of said buffered at least one data record, in a variable number of said segments less than all said segments of said buffer, such that said maintained buffered data is prevented from being overwritten while so maintained; an indicating said maintained buffered data of said variable number of said of said segments, comprises VALID data, whereby said data need not be read from said magnetic tape;

additionally:

upon a command for said magnetic tape data storage system to conduct a backwards read operation, instead provides at least some of said maintained buffered data of said at least one of said segments.

33. In a magnetic tape data storage system for transferring data with respect to magnetic tape for writing and reading data on magnetic tape, said magnetic tape data storage system having a sequential buffer comprising a plurality of segments, the method comprising the steps of:

buffering at least one data record in said sequential buffer in at least one of said segments while conducting a transfer process transferring said at least one data record; and at least subsequent to conducting said transfer process transferring at least one data record, maintaining buffered data of said buffered at least one data record, in at least one of said segments, and less than all said segments of said buffer, such that said maintained buffered data is prevented from being overwritten while so maintained.

34. The method of claim 33, wherein the number of said maintained segments of said buffered at least one data record, comprises a predetermined number of segments of said sequential buffer.

35. The method of claim 34, wherein said predetermined number of maintained segments of said buffered at least one data record, comprises a number of segments related to the total number of said plurality of segments of said sequential buffer.

36. The method of claim 33, wherein said step of maintaining buffered data of said buffered at least one data record, comprises identifying said maintained buffered data of said at least one of said segments, with a segment pointer.

37. In a magnetic tape data storage system for transferring data with respect to magnetic tape for writing and reading data on magnetic tape, said magnetic tape data storage system having a sequential buffer comprising a plurality of segments, the method comprising the steps of:

buffering at least one data record in said sequential buffer in at least one of said segments while conducting a transfer process transferring said at least one data record;

at least subsequent to conducting said transfer process transferring at least one data record, maintaining buffered data of said buffered at least one data record, in at least one of said segments, and less than all said segments of said buffer, such that said maintained buffered data is prevented from being overwritten while so maintained; and indicating said maintained buffered data of said at least one of said segments, comprises VALID data, whereby said data need not be read from said magnetic tape.

38. The method of claim 37, additionally comprising the step of:
upon a command to conduct a backwards spacing and forward read operation, instead providing at least some of said maintained buffered data of said at least one of said segments.

39. The method of claim 37, additionally comprising the step of:
upon a command to conduct a backwards read operation, instead providing at least some of said maintained buffered data of said at least one of said segments.

40. In a magnetic tape data storage system for transferring data with respect to magnetic tape for writing and reading data on magnetic tape, said magnetic tape data storage system having a sequential buffer comprising a plurality of segments, the method comprising the steps of:
buffering at least one data record in said sequential buffer in at least one of said segments while conducting a transfer process transferring said at least one data record; and
at least subsequent to conducting said transfer process transferring at least one data record, maintaining buffered data of said buffered at least one data record, in a variable number of said segments less than all said segments of said buffer, such that said maintained buffered data is prevented from being overwritten while so maintained.

41. The method of claim 40, wherein said variable number of maintained segments of said buffered at least one data record, comprises a number of segments determined as a function of the characterization of said at least one data record.

42. The method of claim 40, wherein said transfer process additionally transfers said data with respect to a host system, and wherein said variable number of maintained segments of said buffered at least one data record, comprises a number of segments determined as a function of the performance of said host system as compared to the performance of said magnetic tape data storage system.

43. The method of claim 40, wherein said transfer process additionally transfers said data with respect to a host system, and wherein said variable number of maintained segments of said buffered at least one data record, comprises a number of segments determined as a function of the frequency of preceding backwards spacing operations conducted with respect to said magnetic tape data storage system by said host system.

44. The method of claim 40, wherein said transfer process additionally transfers said data with respect to a host system, and wherein said variable number of maintained segments of said buffered at least one data record, comprises a number of segments determined as a function of the lengths of preceding backwards spacing operations conducted with respect to said magnetic tape data storage system by said host system.

45. The method of claim 40, wherein said variable number of maintained segments of said buffered at least one data record varies up to a maximum number of segments determined as a function of the total number of said plurality of segments of said sequential buffer.

46. In a magnetic tape data storage system for transferring data with respect to magnetic tape for writing and reading data on magnetic tape, said magnetic tape data storage system having a sequential buffer comprising a plurality of segments, the method comprising the steps of:
buffering at least one data record in said sequential buffer in at least one of said segments while conducting a transfer process transferring said at least one data record;
at least subsequent to conducting said transfer process transferring at least one data record, maintaining buffered data of said buffered at least one data record, in a variable number of said segments less than all said segments of said buffer, such that said maintained buffered data is prevented from being overwritten while so maintained; and
indicating said maintained buffered data of said variable number of said segments, comprises VALID data, whereby said data need not be read from said magnetic tape.

47. The method of claim 46, additionally comprising the step of:
upon a command to conduct a backwards spacing and forward read operation, instead providing at least some of said maintained buffered data of said at least one of said segments.

48. The method of claim 46, additionally comprising the step of:
upon a command to conduct a backwards read operation, instead providing at least some of said maintained buffered data of said at least one of said segments.

49. A computer program product usable with a programmable computer processor having additional computer readable program code embodied in said programmable computer processor, said programmable computer processor for managing a buffer system of a magnetic tape data storage system, said magnetic tape data storage system for writing and reading data on magnetic tape, said buffer system having a sequential buffer comprising a plurality of segments, said computer program product comprising:
computer readable program code which causes said programmable computer processor to buffer at least one data record in said sequential buffer in at least one of said segments while conducting a transfer process transferring said at least one data record; and
said additional computer readable program code which causes said programmable computer processor, at least subsequent to conducting said transfer process transferring at least one data record, to maintain buffered data of said buffered at least one data record, in at least one of said segments, and less than all said segments of said buffer, such that said maintained buffered data is prevented from being overwritten while so maintained.

50. The computer program product of claim 49, wherein said computer readable program code causes said programmable computer processor to maintain said buffered data of said buffered at least one data record, in a predetermined number of segments of said sequential buffer.

51. The computer program product of claim 50, wherein said predetermined number of maintained segments of said buffered at least one data record, comprises a number of segments related to the total number of said plurality of segments of said sequential buffer.

52. The computer program product of claim 49, wherein said computer readable program code causes said programmable computer processor to identify said maintained buffered data of said at least one of said segments, with a segment pointer.

53. A computer program product usable with a programmable computer processor having additional computer readable program code embodied in said programmable computer processor, said programmable computer processor for managing a buffer system of a magnetic tape data storage system, said magnetic tape data storage system for writing and reading data on magnetic tape, said buffer system having a sequential buffer comprising a plurality of segments, said computer program product comprising:

computer readable program code which causes said programmable computer processor to buffer at least one data record in said sequential buffer in at least one of said segments while conducting a transfer process transferring said at least one data record;

said additional computer readable program code which causes said programmable computer processor, at least subsequent to conducting said transfer process transferring at least one data record, to maintain buffered data of said buffered at least one data record, in at least one of said segments, and less than all said segments of said buffer, such that said maintained buffered data is prevented from being overwritten while so maintained; and said additional computer readable program code which causes said programmable computer processor to indicate said maintained buffered data of said at least one of said segments, comprises VALID data, whereby said data need not be read from said magnetic tape.

54. The computer program product of claim 53, additionally comprising computer readable program code which causes said programmable computer processor, upon a command for said magnetic tape data storage system to conduct a backwards spacing and forward read operation, to instead provide at least some of said maintained buffered data of said at least one of said segments.

55. The computer program product of claim 53, additionally comprising computer readable program code which causes said programmable computer processor, upon a command for said magnetic tape data storage system to conduct a backwards read operation, to instead provide at least some of said maintained buffered data of said at least one of said segments.

56. A computer program product usable with a programmable computer processor having additional computer readable program code embodied in said programmable computer processor, said programmable computer processor for managing a buffer system of a magnetic tape data storage system, said magnetic tape data storage system for writing and reading data on magnetic tape, said buffer system having a sequential buffer comprising a plurality of segments, said computer program product comprising:

computer readable program code which causes said programmable computer processor to buffer at least one data record in said sequential buffer in at least one of said segments while conducting a transfer process transferring said at least one data record; and said additional computer readable program code which causes said programmable computer processor, at least subsequent to conducting said transfer process transferring at least one data record, to maintain buffered data of said buffered at least one data record, in a variable number of said segments less than all said segments of said buffer, such that said maintained buffered data is prevented from being overwritten while so maintained.

57. The computer program product of claim 56, wherein said variable number of segments of said buffered at least one data record, comprises a number of segments determined as a function of the characterization of said at least one data record.

58. The computer program product of claim 56, wherein said transfer process additionally transfers said data with respect to a host system, and wherein said variable number of segments of said buffered at least one data record, comprises a number of segments determined as a function of the performance of said host system as compared to the performance of said magnetic tape data storage system.

59. The computer program product of claim 56, wherein said transfer process additionally transfers said data with respect to a host system, and wherein said variable number of segments of said buffered at least one data record, comprises a number of segments determined as a function of the frequency of preceding backwards spacing operations conducted with respect to said magnetic tape data storage system by said host system.

60. The computer program product of claim 56, wherein said transfer process additionally transfers said data with respect to a host system, and wherein said variable number of segments of said buffered at least one data record, comprises a number of segments determined as a function of the lengths of preceding backwards spacing operations conducted with respect to said magnetic tape data storage system by said host system.

61. The computer program product of claim 56, wherein said variable number of segments of said buffered at least one data record, varies up to a maximum number of segments determined as a function of the total number of said plurality of segments of said sequential buffer.

62. A computer program product usable with a programmable computer processor having additional computer readable program code embodied in said programmable computer processor, said programmable computer processor for managing a buffer system of a magnetic tape data storage system, said magnetic tape data storage system for writing and reading data on magnetic tape, said buffer system having a sequential buffer comprising a plurality of segments, said computer program product comprising:

computer readable program code which causes said programmable computer processor to buffer at least one data record in said sequential buffer in at least one of said segments while conducting a transfer process transferring said at least one data record;

said additional computer readable program code which causes said programmable computer processor, at least subsequent to conducting said transfer process transferring at least one data record, to maintain buffered data of said buffered at least one data record, in a variable number of said segments less than all said segments of said buffer, such that said maintained buffered data is prevented from being overwritten while so maintained; and said additional computer readable program code which causes said programmable computer processor to indicate said maintained buffered data of said variable number of said segments, comprises VALID data, whereby said data need not be read from said magnetic tape.

63. The computer program product of claim 62, additionally comprising computer readable program code which causes said programmable computer processor, upon a command for said magnetic tape data storage system to conduct a backwards spacing and forward read operation, to instead provide at least some of said maintained buffered data of said at least one of said segments.

64. The computer program product of claim 62, additionally comprising computer readable program code which causes said programmable computer processor, upon a command for said magnetic tape data storage system to conduct a backwards read operation, to instead provide at least some of said maintained buffered data of said at least one of said segments.

65. A buffer system for a magnetic tape data storage system, said magnetic tape data storage system for transferring data with respect to magnetic tape for writing and reading data on magnetic tape, said buffer system comprising:
a sequential buffer comprising a plurality of segments; and
a buffer management system, said buffer management system:
buffering at least one data record in said sequential buffer in at least one of said segments, as part of said magnetic tape data storage system conducting a transfer process transferring said at least one data record, said buffering additionally comprising making available for overwriting, segments whose data has been transferred, and overwriting said segments made available for overwriting;
tracking said segments made available for overwriting, but which segments have not been overwritten; and
re-enabling as VALID data, data of said tracked segments.

66. The buffer system of claim 65, wherein said buffer management system, additionally:
maintains buffered data of said buffered at least one data record, in at least one of said segments to prevent said maintained buffered data from being overwritten while so maintained; and
in tracking said segments, tracks both said segments available for overwriting, and said segments having said maintained buffered data.

67. The buffer system of claim 66, wherein said buffer management system maintains said buffered data of said buffered at least one data record, in a predetermined number of segments of said sequential buffer.

68. The buffer system of claim 66, wherein said buffer management system maintains said buffered data of said buffered at least one data record, in a variable number of segments of said sequential buffer.

69. A magnetic tape data storage system, comprising:
at least one magnetic head for writing and reading data on magnetic tape;
a drive mechanism for moving a magnetic tape relative to said at least one magnetic head;
a sequential buffer comprising a plurality of segments; and
a control processor for operating said drive mechanism, said at least one magnetic head, and said sequential buffer for transferring data with respect to magnetic tape for writing and reading data on magnetic tape, said control processor:
buffering at least one data record in said sequential buffer in at least one of said segments, as part of said magnetic tape drive conducting a transfer process transferring said at least one data record, said buffering additionally comprising making available for overwriting, segments whose data has been transferred, and overwriting said segments made available for overwriting;
tracking said segments made available for overwriting, but which segments have not been overwritten; and
re-enabling as VALID data, data of said tracked segments.

70. The magnetic tape data storage system of claim 69, wherein said control processor, additionally:
maintains buffered data of said buffered at least one data record, in at least one of said segments to prevent said maintained buffered data from being overwritten while so maintained; and
in tracking said segments, tracks both said segments available for overwriting, and said segments having said maintained buffered data.

71. The magnetic tape data storage system of claim 70, wherein said control processor maintains said buffered data of said buffered at least one data record, in a predetermined number of segments of said sequential buffer.

72. The magnetic tape data storage system of claim 70, wherein said control processor maintains said buffered data of said buffered at least one data record, in a variable number of segments of said sequential buffer.

73. In a magnetic tape data storage system for transferring data with respect to magnetic tape for writing and reading data on magnetic tape, said magnetic tape data storage system having a sequential buffer comprising a plurality of segments, the method comprising the steps of:
buffering at least one data record in said sequential buffer in at least one of said segments while conducting a transfer process transferring said at least one data record, said buffering additionally comprising making available for overwriting, segments whose data has been transferred, and overwriting said segments made available for overwriting;
tracking said segments made available for overwriting, but which segments have not been overwritten; and
re-enabling as VALID data, data of said tracked segments.

74. The method of claim 73, additionally comprising the steps of:
maintaining buffered data of said buffered at least one data record, in at least one of said segments to prevent said maintained buffered data from being overwritten while so maintained; and
said step of tracking said segments comprises tracking both said segments available for overwriting, and said segments having said maintained buffered data.

75. The method of claim 74, wherein said step of maintaining said buffered data of said buffered at least one data record, comprises maintaining said buffered data in a predetermined number of segments of said sequential buffer.

76. The method of claim 74, wherein said step of maintaining said buffered data of said buffered at least one data record, comprises maintaining said buffered data in a variable number of segments of said sequential buffer.

77. A computer program product usable with a programmable computer processor having additional computer readable program code embodied in said programmable computer processor, said programmable computer processor for managing a buffer system of a magnetic tape data storage system, said magnetic tape data storage system for writing and reading data on magnetic tape, said buffer system having a sequential buffer comprising a plurality of segments, said computer program product comprising:
computer readable program code which causes said programmable computer processor to buffer at least one data record in said sequential buffer in at least one of said segments while conducting a transfer process transferring said at least one data record, said buffering additionally comprising making available for overwriting, segments whose data has been transferred, and overwriting said segments made available for overwriting;

said additional computer readable program code which causes said programmable computer processor to track said segments made available for overwriting, but which segments have not been overwritten; and said additional computer readable program code which causes said programmable computer processor to re-enable a VALID data, data of said tracked segments.

78. The computer program product of claim 77, additionally comprising:

computer readable program code which causes said programmable computer processor to maintain buffered data of said buffered at least one data record, in at least one of said segments to prevent said maintained buffered data from being overwritten while so maintained; and said computer readable program code which causes said programmable computer process to track said segments, causes said programmable computer processor to track both said segments available for overwriting, and said segments having said maintained buffered data.

79. The computer program product of claim 78, wherein said computer readable program code causes said programmable computer processor to maintain said buffered data of said at least one data record, in a predetermined number of segments of said sequentially buffer.

80. The computer program product of claim 78, wherein said computer readable program code causes said programmable computer processor to maintain said buffered data of said at least one data record, in a variable number of segments of said sequential buffer.

\* \* \* \* \*